Dec. 31, 1946.  L. A. COURTER  2,413,435
METHOD OF DETERMINING PERMEABILITY OF EARTH FORMATIONS
PENETRATED BY A WELL BORE
Filed May 8, 1944    2 Sheets-Sheet 1

INVENTOR.
Leo A. Courter

BY

Griswold & Burdick
ATTORNEYS

Dec. 31, 1946.   L. A. COURTER   2,413,435
METHOD OF DETERMINING PERMEABILITY OF EARTH FORMATIONS
PENETRATED BY A WELL BORE
Filed May 8, 1944   2 Sheets-Sheet 2

INVENTOR.
Leo A. Courter

BY

Griswold & Burdick
ATTORNEYS

Patented Dec. 31, 1946

2,413,435

UNITED STATES PATENT OFFICE 2,413,435

METHOD OF DETERMINING PERMEABILITY OF EARTH FORMATIONS PENETRATED BY WELL BORES

Leo A. Courter, Seminole, Okla., assignor to The Dow Chemical Company, Midland, Mich., a corporation of Michigan Application May 8, 1944, Serial No. 534,678

5 Claims. (Cl. 73—152)

The invention relates to a method of determining the permeability of formations penetrated by the bore of a well. It more particularly concerns an improved method of ascertaining the elevation and permeability of formations penetrated by a well by determining the rate at which a given fluid can be made to enter fluid receptive portions of the formations.

One of the principal uses of the invention is in connection with the chemical treatment of oil wells to increase their production, although it may be used for other purposes. In the chemical treatment of wells in which an acid solution is introduced to attack and render soluble calcareous matter in the contiguous productive portion of the formations, it is desirable to know the relative fluid permeability of the portions involved in order that the treating agent may be introduced into that portion the permeability of which is relatively low and, therefore, desirable to chemically treat. In many other instances, such as for example, cementing operations, well completions, and formation testing, it is similarly desirable to obtain knowledge relative to the permeability of the various strata or portions thereof penetrated by the bore of a well.

One of the principal objects of the invention is to provide a method whereby the permeability to fluids of a formation penetrated by the bore of a well may be determined readily.

Another object is to provide a method whereby the relative permeability of a plurality of permeable sections can be ascertained together with their elevations in the well bore so as to provide a complete permeability profile of the well.

Other objects and advantages will appear as the description proceeds.

In accordance with my invention, I introduce into the well a first liquid in amount sufficient to cover the formations, the permeability of which is to be determined, and then a second liquid of lower density than, and immiscible with, the first liquid so as to form two liquid columns meeting at an interface in the well bore, the interface initially being above the formations the permeability and elevation of which are to be determined. The interface is then caused to move downwardly by introducing more second liquid at a known and preferably constant rate. The elevation of the interface is determined from time to time as it descends in the well and the interval of time elapsing between each such determinations is recorded. The rate of descent at any elevation of the interface is then determined from the distance traversed by the interface and the time elapsed. The rate of descent of the interface is governed by the rate at which the first liquid escapes into the permeable portions of the formation below the interface under the pressure employed (so long as the well bore is of substantially constant cross-section). The rate of descent of the interface decreases as the interface traverses from one formation to the next below receiving first liquid at a rate differing from the rate at which the preceding formation receives first liquid, if any. The difference in these rates of descent is used in accordance with the invention as a measure of the relative permeability of the portion of the formation traversed by the interface as its rate of descent changes.

The invention then consists in the method hereinafter fully described and particularly pointed out in the claims, the accompanying drawings and following description, setting forth a mode of carrying out the invention in a well penetrating three permeable strata, such mode illustrating, however, but one of the various ways in which the invention may be carried out.

In the said drawings.

Figures 1, 2:
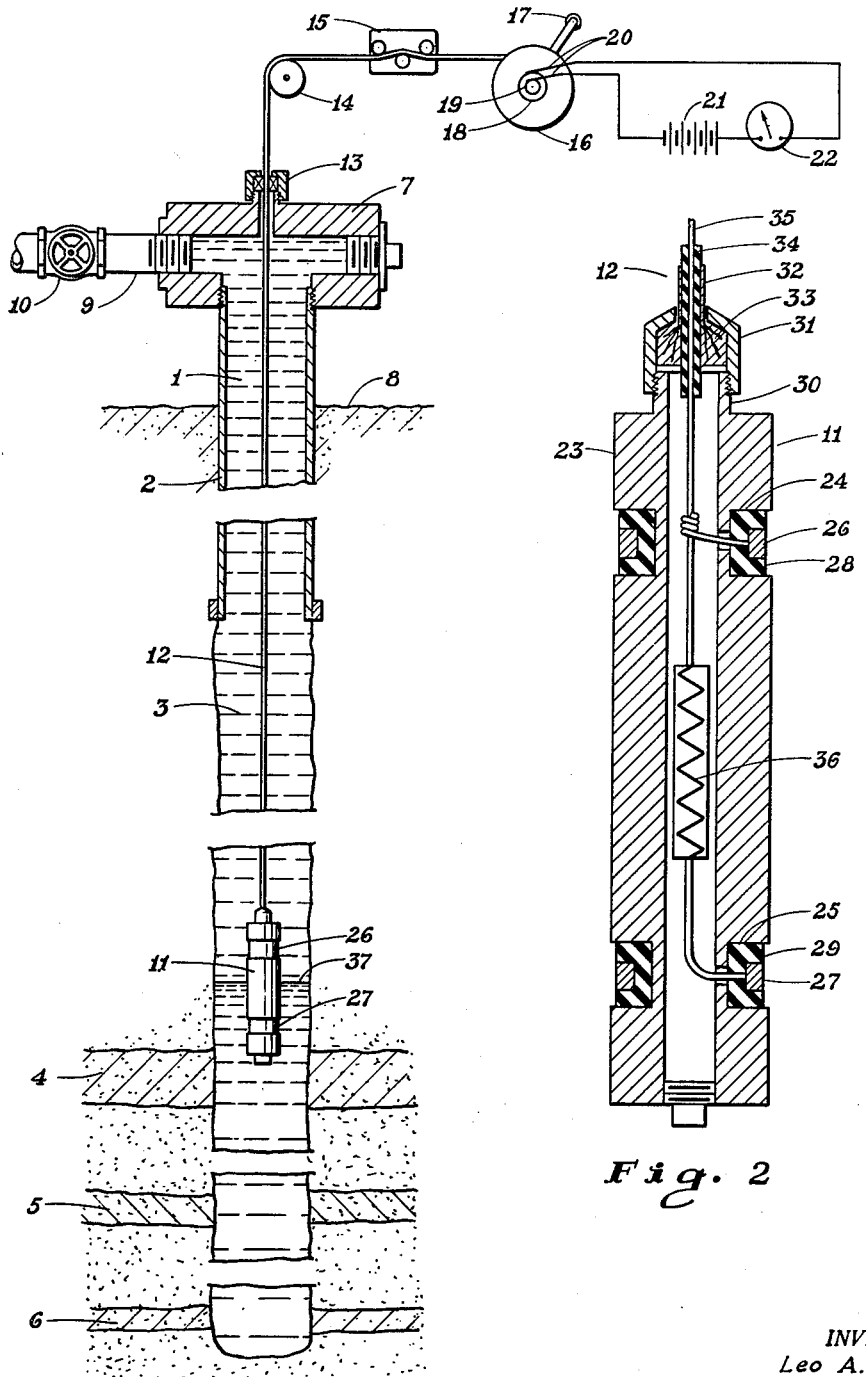
Fig. 1 is a diagrammatic view partly in section showing a well penetrating three fluid-permeable strata and equipped with apparatus for carrying out permeability determinations according to the method of the invention.
Fig. 2 is a detailed view in cross-section of a portion of the apparatus shown in Fig. 1.

As shown in Fig. 1, the upper portion 1 of the well bore is cased with metal pipe 2 while the lower uncased portion 3 of the well passes through permeable strata 4, 5, and 6, respectively, the relative permeabilities of which are to be determined. Removably attached to the casing is a head 7 above the ground level 8, the head being provided with an inlet 9 and inlet valve 10. Within the well is shown the interface locator 11 suspended by the twin conductor cable 12 which runs through a stuffing box 13 over pulley 14 through a cable length meter 15 onto a reel 16 provided with a crank 17. The ends of each of the twin conductors of cable 12 on the reel are connected to slip rings 18 and 19, respectively. The slip rings are connected by brushes 20 in series with a battery 21 and a voltmeter 22.

In the more detailed view of the interface locator 11, shown in Fig. 2, 23 designates its cylindrical body member having a pair of circumferential grooves 24 and 25, respectively, in which are mounted ring-like electrodes 26 and 27, respectively, insulated from the body member with suitable insulation 28 and 29. The upper end of the body member is provided with a threaded boss 30 on which is screwed cable holder 31 having a passage through which the twin conductor cable 12 passes. As shown, cable 12 comprises twin conductors, one of which is the outer metallic sheath 32 composed of woven strands of wire (bare), the frayed ends 33 of which are soldered to the inside of the cable holder 31. Under the metallic sheath 32, is insulation 34 surrounding the other conductor which is the central wire 35. This extends into the hollow central portion of the body member and is connected to the electrode 26 which in turn is connected through a resistance 36 to electrode 27.

In carrying out the method of the invention wherein, for example, it is desired to ascertain the relative permeability of the three strata penetrated by the uncased portion 3 of the well bore, the interface locator 11 is positioned initially so that the lowermost electrode 27 will be at any point above the uppermost permeable stratum 4. Thereafter, a first liquid, as an electrical conducting liquid, e. g., a saline solution, is introduced into the well through the valve 10 and pipe 9 until the liquid level in the well is high enough to make contact with electrode 27 but not with electrode 26. Contact with the electrode 27 by the saline liquid closes the circuit which includes the electrode 27, the resistance 36, the conductor 35, the voltmeter 22, the battery 21, the conductor cable sheath 32, and the interface locator body member 23 which acts as the other electrode working in conjunction with either or both electrodes 26 and 27. The circuit being thus closed by the first liquid contacting the electrode 27, there is a corresponding deflection in the voltmeter which indicates that such contact has been made. (By choosing appropriate values for the ohmic resistance of the resistance 36 and the balance of the circuit, the voltmeter scale deflection can be calibrated to read for convenience one-half the full scale reading when electrode 27 contacts the first liquid and the full scale reading when electrode 26 also contacts the same liquid. The voltmeter readings thus can be made to reveal specifically which electrode, if any, is submerged in the first liquid.) In order to make certain that a sufficient depth of first liquid has been introduced into the well, it may be filled up or to slightly beyond the casing seat, however, this is usually not necessary as the well drilling log may be relied upon when available to indicate the approximate depth of the shallowest permeable portion of the formation, and it is sufficient for the purpose if this be covered with first liquid before introducing the second liquid.

After the first liquid has been introduced into the well to a suitable depth, a second liquid, such as a non-conducting liquid, e. g., oil, which is immiscible with, and of lower specific gravity than, the first liquid, is introduced into the well through valve 10 and pipe 9 so as to form two columns which meet at the interface 37 above the formations to be measured. Sufficient pressure of second liquid is built up so as to cause the interface to descend in the bore, such descent being indicated by the reduced deflection on the voltmeter corresponding to the loss of contact between the conducting liquid and the lower electrode 27 as the first liquid descends below the electrode. The interface locator then is lowered by unwinding cable from the reel 16 at a rate such that electrode 27 again makes contact with the first liquid and the pair of electrodes 26 and 27 subtends the interface 37. If the interface locator is lowered too rapidly, this will be indicated by an increased deflection on voltmeter 22 as electrode 26 comes in contact with the conducting liquid, or if lowered too slowly the deflection on the voltmeter will decrease as electrode 27 loses contact with first liquid. Accordingly, the proper rate of lowering of the interface locator can be ascertained by reference to the voltmeter readings and is adjusted so as to maintain the upper electrode in the non-conducting liquid and the lower electrode in the conducting liquid. While the rate of lowering of the interface locator is thus regulated to keep pace with the descending interface and non-conducting liquid is introduced at a substantially constant rate into the well so as to cause the interface 37 to descend under known and controlled conditions, its rate of descent and position are ascertained as by periodic observations of the length of conductor cable 12 paid out and measured by the cable meter 15 while the time elapsing as the interface locator descends to the observed depth is recorded. From the depth of the interface locator thus periodically obtained and the time elapsing in descending to the observed depth, the relative permeability of the formations traversed by the interface is computed as described in what follows.

Figure 3:
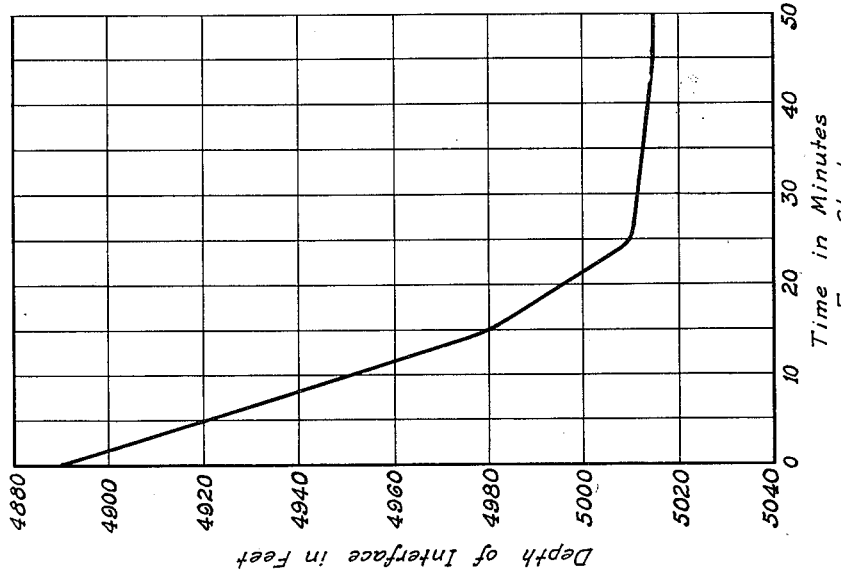
Fig. 3 is a graph correlating the depth of the interface in the well bore of Fig. 1 with the time elapsing from the beginning of descent of the interface in an example of the practice of the invention.

In proceeding with the permeability determination, in accordance with the data obtained by the foregoing method, it is convenient to make a plot as in Fig. 3 of the depth of the interface locator, which is taken as the depth of the interface, and correlate this with the time elapsing from the beginning of the downward movement of the interface brought about by the introduction into the well of the second, or non-conducting liquid, at the known rate. From this plot, the rate of descent is computed and plotted against the depth as in Fig. 4, and then the relative permeability is derived, this being plotted in Fig. 5 to give a complete permeability profile of the well.

In the example chosen, the well bore involved had a uniform diameter of 4.75 inches and, therefore, a liquid volume of 0.924 gallon per foot of depth. After filling with first liquid to a depth of 4890 feet (a point well above the uppermost permeable stratum, e. g., 4, Fig. 1) and positioning the interface locator so that electrode 27 contacted the first liquid, second liquid was introduced into the bore at the rate of 5.54 gallons per minute. The interface 37 was thereby caused to descend in the well hole past the permeable strata 4, 5, and 6 in succession and the time and distance travelled by the interface followed by the interface locator as described. The interface locator descended from 4890 feet to 4980 feet in the first 15 minutes, from 4980 feet to 5010 feet depth in the next 10 minutes, and then from 5010 feet to 5015 feet in the next 20 minutes, these data being plotted in Fig. 3. From these data, the rate of descent of the interface in feet per minute was computed and plotted as in Fig. 4. This graph shows that the interface descended at first at a constant rate of 6 feet per minute which rate corresponded to the computed rate of filling the bore with second liquid and, therefore, no permeable stratum was encountered until the interface reached the depth of 4980 feet at which the rate of descent changed to 3 feet per minute. The rate then remained constant until the depth of 5010 feet was reached at which the rate again changed to the new value of 0.25 foot per minute and thereafter became zero at 5015 feet.

Figure 5:
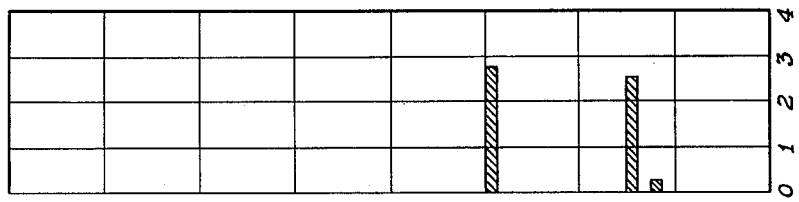
Fig. 5 is a graph based on Fig. 4 correlating the relative permeability of the formations with their depths.
Figure 4:
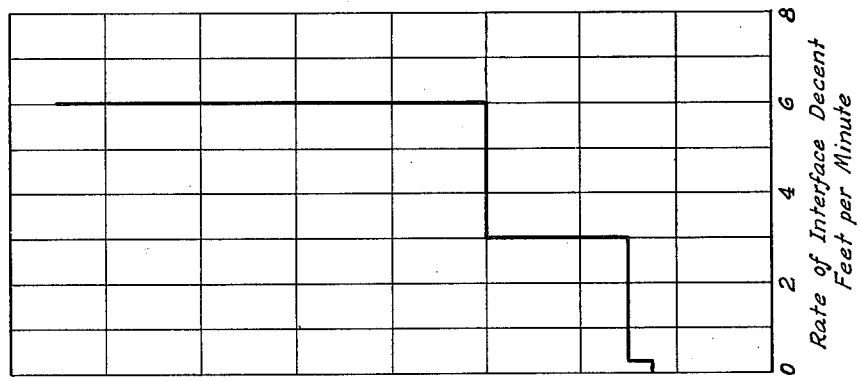
Fig. 4 is a graph based upon Fig. 3 correlating the rate of interface descent with the depth of the interface.

From these rates of descent, the relative permeabilities of the three strata traversed by the interface as its rate of descent changed were computed and plotted in Fig. 5. As shown in Fig. 4, the first change in rate of descent corresponded to decrease of 3 feet per minute indicating that first liquid was entering stratum 4 (4980 feet) at a rate corresponding to $3 \times 0.924 (=2.77)$ gallons per minute, and this is plotted in Fig. 5 as the relative permeability of stratum 4. Similarly, at stratum 5 where the rate of descent changed from 3 to 0.25 feet per minute, $2.75 \times 0.924 (=2.54)$ gallons per minute of first liquid entered stratum 5 and is plotted as the relative permeability of that stratum. Again at stratum 6 where the rate changed from 0.25 to 0, $0.25 \times 0.924 (=0.23)$ gallon per minute entered stratum 6 and represents its relative permeability.

While the method has been illustrated with an example of the usual type of well encountered in practice, it is to be understood that the method may be used with other types of wells penetrating different formations in which other factors besides permeability may affect the rate of descent of the interface, such as variations in bore hole diameter, variations in the pressure applied to the second liquid to cause the first liquid to enter the permeable portions of the well, and differences in the fluidity characteristics of the first and second liquids. In the above example, these disturbing factors were not involved but even when such factors are involved their effects can be predicted and taken into consideration thereby permitting the method wide application under a wide range of well conditions. For example, the effect on the rate of descent of the interface of variations in bore hole cross-section can be compensated for and such variations usually reveal themselves in the course of operation of the method by exerting a characteristic slowing or speeding of the descent of the interface, the effect persisting for only so long as the interface traverses from one cross-sectional area to another. Enlargements of the bore hole, for example, reduce the rate of descent in direct proportion to the amount of the enlargement while constrictions operate in directly opposite manner.

The plot of the distance descended by the interface against the elapsed time, when there are such changes in the bore hole cross-section, is merely displaced along the time axis an amount corresponding to the time taken to supply the difference in the amount of liquid involved as the interface traverses that portion of the bore and are easily recognizable as being in general different from changes in the slope of the plot due to the permeability changes being determined. Similarly, pressure effects can be spotted and discounted. For example, the pressure applied, if not maintained constant, can be recorded so that its effect on the rate of descent of the interface can be estimated or distinguished from the effect of permeability. Such distinction can be made on the basis that an increase of pressure gives a proportional increase in the rate of descent of the interface.

Differences in the fluidity characteristics of the two liquids employed do not generally affect the elevations at which the permeable zones are found but may slightly affect the numerical values of the relative permeabilities computed from the rate of descent data when the two liquids have very marked differences in the ease with which they can be forced into strata of equal permeability. By either choosing two immiscible liquids having somewhat similar fluidity characteristics or by compensating for their difference in ease of entering similar formations, their effect on the relative permeability figures is minimized. In any event, any two immiscible liquids which will stratify in the well bore so as to meet at an interface, the depth of which can be measured, may be used to obtain a useful measure of relative permeability or the liquid receptive quality of adjacent formations.

Other modes of applying the principle of my invention may be employed instead of the one explained, change being made as regards the method herein disclosed, provided the steps stated by any of the following claims or equivalent of such steps be employed.

I claim:

1. In a method of determining the fluid permeability and elevation of earth formations penetrated by a well bore, the steps which comprise introducing into the well a first liquid in amount sufficient to fill the well to a point above the formations to be measured; introducing into the well a second liquid having a lower density than the first and immiscible therewith so as to form two liquid columns meeting at an interface in the well above the formations to be measured; continuing the introduction of the second liquid at a known rate so as to force the first liquid out of the well into the adjacent formations while ascertaining the rate of descent of the interface thereby causing the interface to descend, its rate of descent changing on traversing a fluid permeable portion of the well; and ascertaining the elevation of the interface as its rate of descent changes, the change in the rate of descent being a measure of the permeability of the formations at the elevation at which the rate of descent changes.

2. In a method of determining the fluid permeability and elevation of earth formations penetrated by a bore of a well, the steps which consist in filling the bore with a saline liquid to a point above the formations to be measured; introducing into the well at a constant rate an oil so as to form two liquid columns meeting at an interface in the well above the formations to be measured while ascertaining the rate of descent of the interface, the interface falling in the well bore as the first liquid is forced by the second liquid into the adjacent formations to below a fluid permeable portion thereby changing its rate of descent; and ascertaining the elevation of the interface as its rate of descent changes, the change in the rate of descent being a measure of the permeability of the formations at the elevation at which the rate of descent changes.

3. In a method of measuring the elevation and relative permeability of fluid receptive portions of the earth formations penetrated by the bore of a well having a known cross-section, the steps which consists in introducing into the well bore a first liquid in amount sufficient to fill the bore to a point above the fluid receptive portions of the formations to be measured; introducing a second liquid immiscible with the first and having a lower density so as to form two liquid columns meeting at an interface in the well bore above the formations to be measured, the second liquid being introduced at a known rate so as to force the first liquid into fluid receptive portions of adjacent formations below the interface and thereby cause the interface to descend; periodically ascertaining the elevation of the interface and the corresponding time elapsing during the descent thereof at the ascertained elevation, whereby to obtain a descent rate corresponding to each formation traversed by the interface, the difference between any preceding descent rate and the next following being a measure of the fluid permeability of the fluid receptive portion of the formations traversed by the interface as its rate of descent changes.

4. In a method of measuring the elevation and relative permeability of fluid receptive portions of earth formations penetrated by the bore of a well having a substantially uniform cross-section, the steps which consist in introducing into the well bore an electrically conductive liquid in amount sufficient to fill the bore to a point above the fluid receptive portions of the earth formations to be measured; introducing a second liquid immiscible with the first and having a lower conductivity and density so as to form two liquid columns meeting at an interface in the well bore above the formations to be measured; suspending in the well bore an electrical interface locator having a pair of electrodes spaced one above the other and positioning the same so that the electrodes subtend the interface; introducing said second liquid at a constant rate so as to force said first liquid into fluid receptive portions of the adjacent earth formation below the interface and thereby cause the interface to descend; lowering the interface locator at a rate such that the electrodes subtend the interface; periodically ascertaining the elevation of the interface locator and the corresponding time elapsing during the descent to said elevation, whereby to obtain a descent rate corresponding to each formation traversed by the interface, the difference between any preceding descent rate and the next following being a measure of the fluid permeability of the fluid receptive portions of the formations traversed by the interface as its rate of descent changes.

5. In a method of determining the permeability profile of a well bore penetrating a plurality of fluid permeable strata, the steps which consist in filling the bore with a liquid to a point substantially above the shallowest stratum; introducing a second liquid immiscible with the first and of lower specific gravity so as to form a column of the second liquid upon the first liquid meeting at an interface above the shallowest stratum; applying pressure upon the first liquid with the second liquid sufficient to cause the first liquid to flow into the fluid receptive strata below the interface thereby lowering the interface past each such strata in succession at a rate which changes as it traverses a fluid receptive stratum; and ascertaining the difference in the rate of lowering of the interface before and after it traverses each fluid receptive stratum due to escape of first liquid thereinto, said differences being a measure of the relative permeability of each stratum.

LEO A. COURTER.